Sept. 3, 1957  E. W. CLEMENT  2,804,895
COUNTERBORE ATTACHMENT FOR DRILLS
Filed Nov. 14, 1955

Eldon W. Clement
INVENTOR.

BY *Clarence A. O'Brien*
*and Harvey B. Jacobson*
Attorneys

United States Patent Office 2,804,895
Patented Sept. 3, 1957

---

2,804,895

COUNTERBORE ATTACHMENT FOR DRILLS

Eldon W. Clement, Fall River Mills, Calif.

Application November 14, 1955, Serial No. 546,491

1 Claim. (Cl. 145—125)

The present invention relates to new and useful improvements in tools designed for boring a hole and cutting a flat surface in poles to support crossarms thereon.

An important object of invention is to provide a boring tool of this character which includes a counterbore attachment adapted for connecting to an electric drill and by means of which the bore and counterbore may be formed at a single operation.

Another object of the invention is to provide a counterbore attachment which includes a pilot to which a drill bit is attached and which forms a hub for a circular saw blade as well as for a plurality of radial blades positioned internally of the circular saw blade to produce a counterbore for a hole bored by the drill bit.

A further object of the invention is to provide an annular retractible guard which surrounds the saw blade and which is held in a protected position with respect to the saw blade by spring means.

A still further object is to provide a tool of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 6 is a side elevational view of an auger adapted for use with the counterbore attachment.

Figure 1:
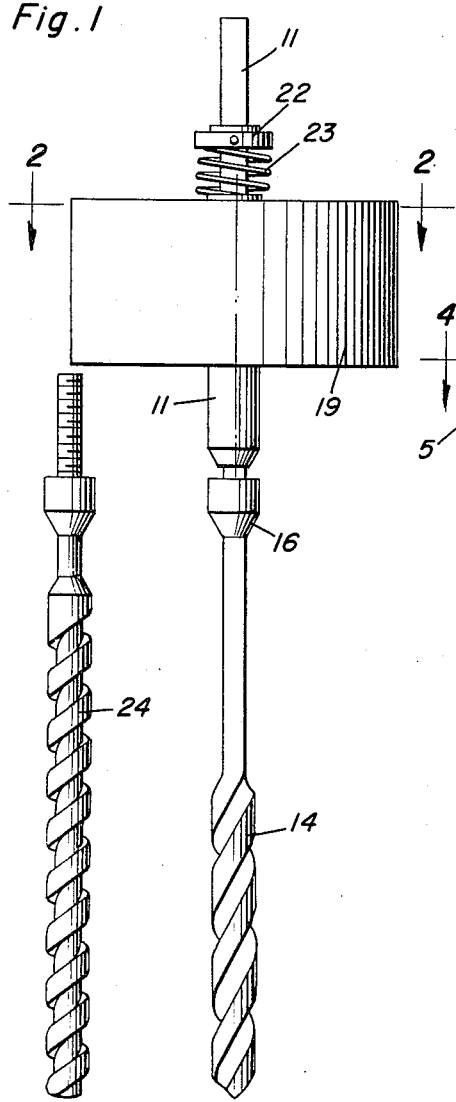
Figure 1 is a side elevational view.
Figure 3:
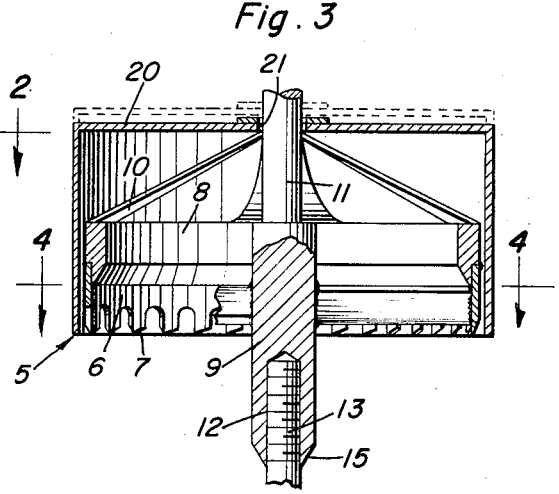
Figure 3 is an enlarged vertical sectional view taken on a line 3—3 of Figure 1.
Figure 4:
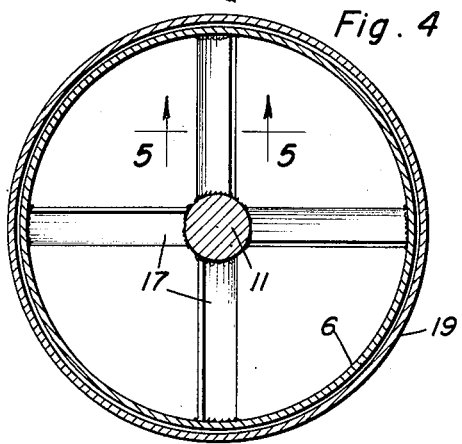
Figure 4 is a transverse sectional view taken on a line 4—4 of Figure 3.
Figure 5:
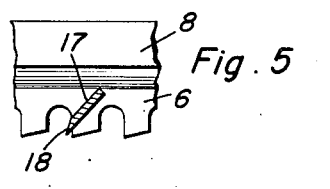
Figure 5 is a fragmentary sectional view taken on a line 5—5 of Figure 4.
Figure 2:
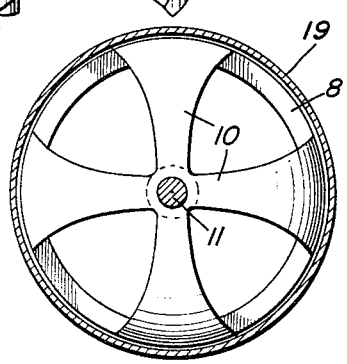
Figure 2 is a transverse sectional view taken on a line 2—2 of Figure 1.

Referring now to the drawing in detail wherein for the purpose of illustration I have disclosed a preferred embodiment of invention, the numeral 5 designates the counterbore attachment generally and which includes a circular blade 6 having saw teeth 7 at its lower edge. The blade 6 is welded or otherwise suitably secured to a ring 8 at the rear edge of the former and with the periphery of the blade flush with the periphery of the ring.

A pilot 9 is secured at the center of the blade 6 and ring 8 by means of a plurality of radially disposed brace arms 10 which connect the rear edge of ring 8 to a shank 11 which is integrally formed with the pilot and extends upwardly therefrom. The pilot 9 projects downwardly below the teeth 7 of the blade 6 and the lower end of the pilot is formed with a threaded bore 12 for connecting the threaded upper end 13 of a drill bit 14 therein. The lower end of the pilot is tapered as shown at 15 and the drill bit 14 is formed at its upper portion with a tapered collar 16 of a diameter corresponding to the diameter of the pilot 9.

A plurality of radial blades 17 are welded at their inner ends to the pilot 9 and are welded at their outer ends to the interior of the blade 6 and the radial blades 17 are inclined in the direction of rotation of the cutter 6 and the saw teeth 7 and the lower beveled edges 18 of the blades 17 are positioned inwardly with respect to the saw teeth 7.

An annular guard 19 surrounds the cutter 6 and ring 8 in outwardly spaced relation with respect to the latter and the guard includes a top 20 which rests on the brace arms 10 and is formed with a central opening 21 in which the shank 11 is slidable.

The shank 11 projects upwardly above the top 20 of the guard 19 and is provided with a collar 22 secured in adjustable spaced relation above the top of the guard and a coil spring 23 is positioned on the shank and is tensionally held between the top 20 of the guard and the collar 22 to urge the guard downwardly on the shank.

An auger of a type shown at 24 may be interchangeably connected to the pilot 9 and various other types of bits or augers may be attached to the pilot in accordance with the type of bore to be drilled in the work.

In the operation of the tool, the upper end of shank 11 is connected to an electric drill or other power device to rotate the bit 14 and the circular saw blade 6. As the bit 14 passes through a pole or other work the pilot 9 follows the bit into the bore and the teeth 7 of saw blade 6 and the blades 12 carried internally thereof produce a flat counterbore in the surface of the work.

The guard 19 is held in protected position surrounding the saw blade 6 by the spring 23 and as the saw blade penetrates the work, the guard is retracted on the shank 11 to permit the cutting of the counterbore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A counterbore attachment for drill bits comprising a ring-like saw blade, a pilot at the center of the saw blade and having a bore at its lower end adapted for attaching a drill bit therein, radial braces connecting the pilot to the rear portion of the saw blade, a plurality of radial cutting blades internally of the saw blade, said radial blades being fixed at their inner ends to the pilot and fixed at their outer ends to the saw blade adjacent the teeth of the latter, an annular guard slidably supported on the upper portion of the pilot above and closely surrounding the saw blade, and spring means engaging and urging the guard downwardly in protective position and with the lower edge of the guard substantially coplanar with respect to the teeth of the saw blade.

References Cited in the file of this patent

UNITED STATES PATENTS

| | | |
|---|---|---|
| 25,990 | Wood | Nov. 1, 1859 |
| 718,996 | Franz | Jan. 27, 1903 |
| 958,112 | Halliwell | May 17, 1910 |
| 1,249,332 | Cline | Dec. 11, 1917 |
| 2,484,150 | Brown | Oct. 11, 1949 |
| 2,643,692 | O'Brien | June 30, 1953 |